(12) United States Patent
Kim et al.

(10) Patent No.: US 7,916,650 B2
(45) Date of Patent: Mar. 29, 2011

(54) NETWORK DEVICE AND DATA TRANSMISSION METHOD THEREOF IN WIRELESS SENSOR NETWORK

(75) Inventors: Eui Jik Kim, Suwon-si (KR); Sun Gi Kim, Seoul (KR); Hyo Hyun Choi, Seoul (KR); Jeong Geun Kim, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 61 days.

(21) Appl. No.: 12/321,532

(22) Filed: Jan. 22, 2009

(65) Prior Publication Data

US 2009/0207747 A1    Aug. 20, 2009

(30) Foreign Application Priority Data

Jan. 22, 2008    (KR) .............................. 2008-0006591

(51) Int. Cl.
*G01R 31/08*    (2006.01)
(52) U.S. Cl. ........................ 370/241; 370/252; 370/329
(58) Field of Classification Search .......... 370/200–253, 370/345, 431, 445
See application file for complete search history.

(56) References Cited

U.S. PATENT DOCUMENTS

| | | | | |
|---|---|---|---|---|
| 7,321,580 | B1 * | 1/2008 | Ramanathan et al. | 370/339 |
| 2002/0154653 | A1 * | 10/2002 | Benveniste | 370/447 |
| 2006/0274776 | A1 * | 12/2006 | Malik et al. | 370/445 |
| 2008/0181192 | A1 * | 7/2008 | Nabetani et al. | 370/345 |

\* cited by examiner

*Primary Examiner* — Ricky Ngo
*Assistant Examiner* — Iqbal Zaidi
(74) *Attorney, Agent, or Firm* — Cha & Reiter, LLC

(57) ABSTRACT

A wireless sensor network and data transmission method thereof provides for improving channel access efficiency and energy saving effect by using inventive carrier sensing mechanism. The data transmission method includes assessing a channel after initializing, when a packet to be transmitted is generated, a number of carrier sensing attempts (Ns) and a backoff value (W); determining, when the channel availability is assessed to be idle, whether W reaches 0; transmitting the packet if W reaches 0; and reassessing, if W does not reach 0, the channel after a duration corresponding W/(Ns-1) slot.

15 Claims, 5 Drawing Sheets

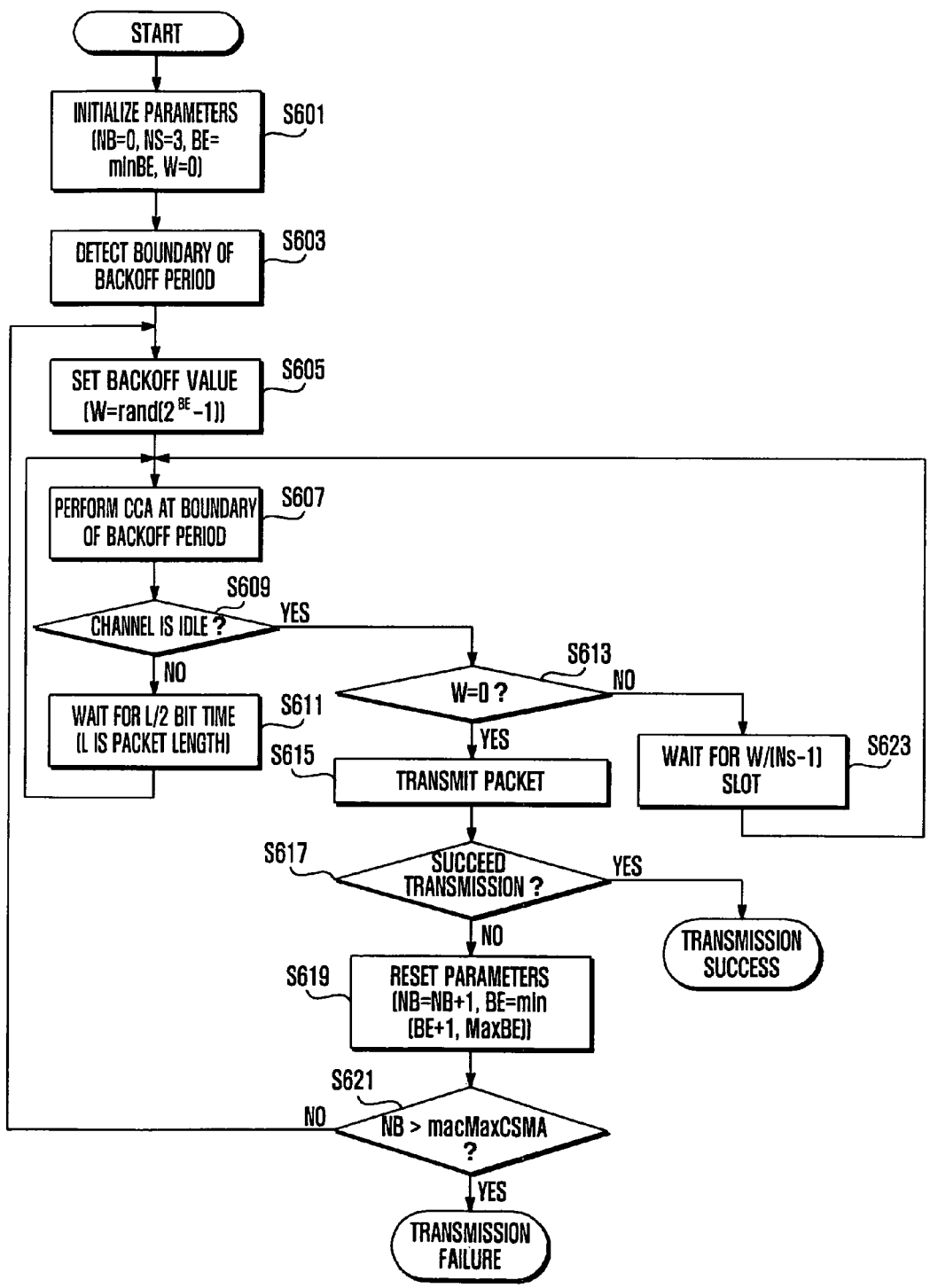

NETWORK DEVICE AND DATA TRANSMISSION METHOD THEREOF IN WIRELESS SENSOR NETWORK

CLAIM OF PRIORITY

This application claims priority from an application entitled "NETWORK DEVICE AND DATA TRANSMISSION METHOD THEREOF IN WIRELESS SENSOR NETWORK" filed in the Korean Intellectual Property Office on Jan. 22, 2008 and assigned Serial No. 2008-0006591, the contents of which are incorporated herein by reference in its entirety.

BACKGROUND OF THE INVENTION

1. Field of the Invention

The present invention relates to a wireless sensor network. More particularly, the present invention relates to a network device for a wireless sensor network and data transmission method thereof that is capable of improving channel access efficiency and saves energy.

2. Description of the Related Art

Wireless networks built as Wireless Local Area Network (WLAN) and Wireless Personal Area Network (WPAN) are being widely deployed and the two types of networks coexisting with each other. Typically, a WLAN is implemented on the basis of the Institute of Electrical and Electronics Engineers (IEEE) 802.11x standards for supporting a relatively broad coverage area of 100 m, and a WPAN is implemented on the basis of the IEEE 802.15x standards. Several IEEE 802.15 standards, which includes Bluetooth, ZigBee, and Ultra Wideband (UWB), are currently either ratified or under development for use in wireless sensor networks. A wireless sensor network is composed of a plurality of spatially distributed sensor nodes. These sensor nodes share a single channel for transmitting data in active period. That is, the sensor nodes collect information in real time and transmit the information to a sink node in active periods.

In a case of IEEE 802.11 based WLAN, a network device performs carrier-sensing for checking whether or not the channel is idle. If the device determines that the channel is busy, the network device senses the channel until the channel is idle. The carrier-sensing is performed to detect the presence of ongoing transmissions by a Clear Channel Assessment (CCA) method. With the use of CCA method, the IEEE 802.11 WLAN is advantageous in channel access efficiency but not in energy utilization efficiency.

In an IEEE 802.15 based WPAN, however, a sensor node performs carrier-sensing once after the backoff period. If the sensor node detects that the channel is busy, the sensor node increases a contention window to twice the original size. The sensor node sets the contention window during the active period and then transmits the information during the contention period. That is, as a result of the carrier sensing, if the channel is idle, the sensor node transmits packets. On the other hand, if the channel is already occupied by another node or the previous transmission attempt fails, the sensor node retries the transmission with exponentially increased contention window size.

For this reason, the IEEE 802.15 WPAN is considered to be superior to the IEEE 802.11 WLAN in view of energy utilization efficiency. In the IEEE 802.15 WPAN, however, the sensor node recognizes the idle time of the channel and increases the contention window size exponentially in a conservative manner, resulting in low channel access efficiency.

SUMMARY OF THE INVENTION

The present invention provides a network device and data transmission method thereof for a wireless sensor network that is capable of improving channel access efficiency without compromising energy saving efficiency.

The present invention additionally provides a network device and data transmission method thereof for a wireless sensor network that is capable of improving channel access efficiency by reducing data transmission latency.

Also, the present invention provides a network device and data transmission method thereof for a wireless sensor network that is capable of improving energy saving efficiency and channel access efficiency simultaneously.

In accordance with an exemplary embodiment of the present invention, a data transmission method for a wireless sensor network having a network coordinator and a plurality of network devices may includes the steps of assessing a channel availability after initializing, when a packet to be transmitted is generated, a number of carrier sensing attempts (Ns) and a backoff value (W); determining, when the channel availability is assessed to be idle, whether W reaches 0; transmitting the packet if W reaches 0; and reassessing, if W does not reach 0, the channel after a duration corresponding W/(Ns−1) slot.

In accordance with another exemplary embodiment of the present invention, a network device for a wireless sensor network having a network coordinator and a plurality of network devices includes a memory unit for storing a packet generated in the network device; a control unit for initializing, when a packet to be transmitted is generated, a number of carrier sensing attempts (Ns) and a backoff value (W) and assessing a channel availability, determining, when the channel availability is assessed to be idle, whether W reaches 0, transmitting the packet if W reaches 0, and reassessing, if W does not reach 0, the channel after a duration corresponding W/(Ns−1) slot; and a radio frequency unit for transmitting the packet.

BRIEF DESCRIPTION OF THE DRAWINGS

The above and other exemplary objects, features and advantages of the present invention will become more apparent from the following detailed description in conjunction with the accompanying drawings, in which:

FIG. 6 is a flowchart illustrating a data transmission method of a network device according to another exemplary embodiment of the present invention.

DETAILED DESCRIPTION

Figure 1:
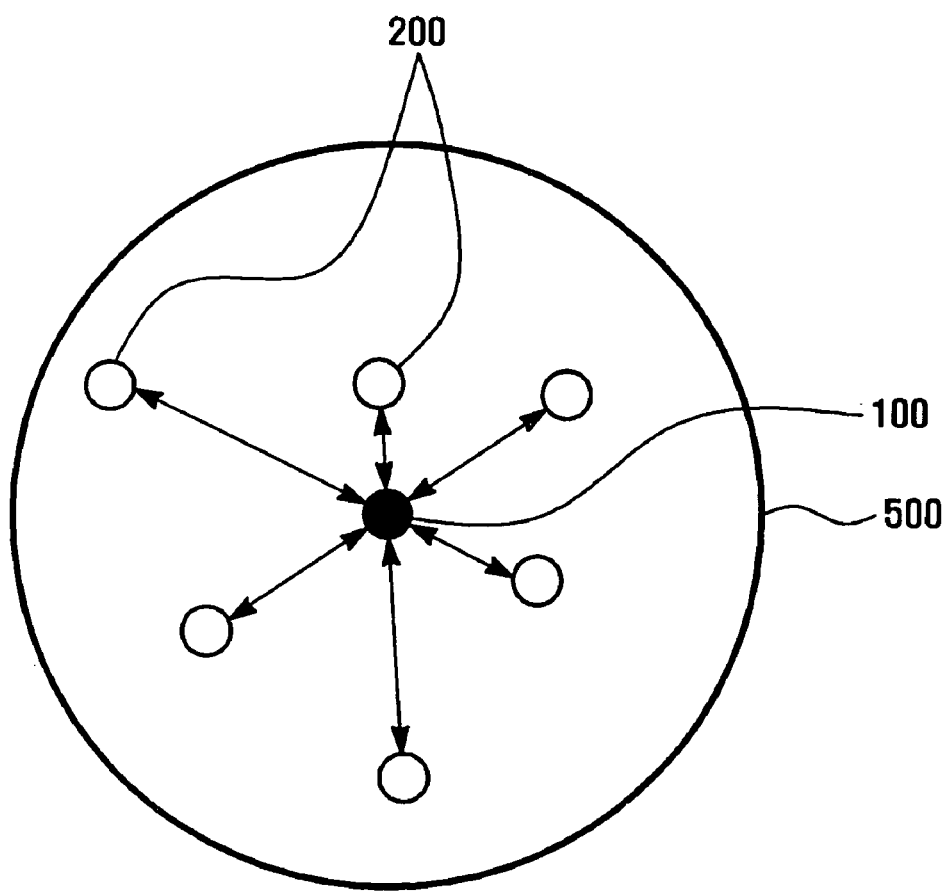
FIG. 1 is a schematic diagram illustrating a wireless sensor network according to an exemplary embodiment of the present invention.

Exemplary embodiments of the present invention are now described herein with reference to the accompanying drawings in detail. The same reference numbers are used throughout the drawings to refer to the same or similar parts. Detailed descriptions of well-known functions and structures incorporated herein may be omitted to avoid obscuring appreciation of the subject matter of the present invention by a person of ordinary skill in the art. In the drawings, certain elements may be exaggerated or omitted or schematically depicted for clarity of the invention.

FIG. 1 is a schematic diagram illustrating a wireless sensor network according to an exemplary embodiment of the present invention.

Referring now to FIG. 1, the wireless sensor network 500 according to an exemplary embodiment of the present invention includes a network coordinator 100 and a plurality of network devices 200.

The wireless sensor network 500 can be implemented in the form of an independent network in which the network coordinator 100 connects and coordinates the network devices 200. In a case where a plurality of wireless sensor networks coexist, the wireless sensor networks can be identified by identification information that is uniquely assigned. The network devices 200 communicate with the network coordinator 100 through a shared channel.

Still referring to FIG. 1, the wireless sensor network 500 can be implemented, for example, with any of wireless personal area network standards that are ratified or under development, such as Bluetooth (IEEE 802.15.1), UWB (IEEE 802.15.3), and ZigBee (IEEE 802.15.4). Although the data transmission method is described in association with an IEEE 802.15.4 standard-based WPAN in the following, the present invention is not limited thereto.

The wireless sensor network 500 can be implemented, for example, in cluster-tree network topology in which a network coordinator provides synchronization services to sub-network coordinators. In this case, sub-network coordinators act as network devices to the network coordinator 100. The network allows the optional use of a superframe structure.

The network coordinator 100 can be, for example, a dedicated device or a network device designated to control the network. The network coordinator 100 is responsible for coordinating the network to communicate with the network devices 200, and the network devices 200 receive information required for communication through control information provided by the network coordinator 100.

For example, the network coordinator 100 broadcasts beacon frames to neighboring network devices 200 periodically. The network coordinator 100 can transmit specific data to the network devices. If a beacon frame is received, the network devices 200 can communicate with the network communicator 100. Since the network devices 200 belonged to the same wireless sensor network 500 communicate through a shared signal channel, they compete to occupy the channel. Only the network device 200 that has preoccupied the channel can transmit data to the network coordinator 100.

Figure 2:
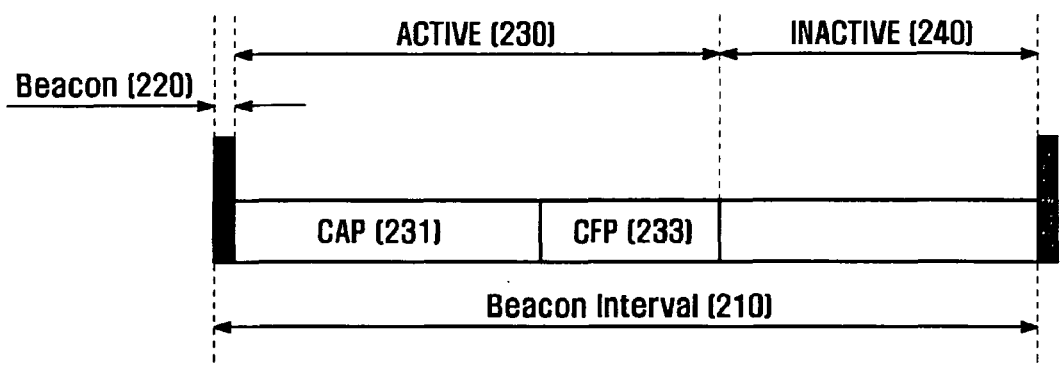
FIG. 2 is a diagram illustrating a structure of a superframe for use in a wireless sensor network according to an exemplary embodiment of the present invention.

FIG. 2 is a diagram illustrating a structure of a superframe for use in a wireless sensor network according to an exemplary embodiment of the present invention.

Referring now to FIG. 2, a superframe starts with a beacon frame 220 that is transmitted periodically during a beacon interval 210. The superframe includes, for example, an active period 230 and an inactive period 240. During the active period 230, the network devices 200 including the network coordinator 100 are powered on so as to communicate packets. The network devices 200 and network coordinator 100 are powered off in the inactive period 240 in order to minimize energy consumption. The lengths of the active period 230 and inactive period 240 are determined by the network coordinator 100 and notified to the network devices 200 through the beacon frame 220. That is, the network coordinator 100 informs the network devices 200 of a start and an end time of the active period 230 using the beacon frame 220.

In addition, the active period 230 consists of Contention Access Period (CAP) 231 and Contention Free Period (CFP) 233. Any network device 200 wishing to communicate during the CAP 231 must compete with the other network devices 200 through the use of a Carrier Sense Multiple Access/Collision Avoidance (CSMA/CA) mechanism. That is, each one of the network devices 200 sets a contention window and competes with the other network devices of the same cluster for preoccupying the channel. If the channel is determined to be idle, a particular network device 200 transmits data. During the CFP 233, the network device 200 occupies the channel using a Guaranteed Time Slot (GTS) mechanism.

Now the structure of the network device will be described. Here, the network device represents one of the network devices 200 and the network coordinator 100 shown in FIG. 1.

Figure 3:
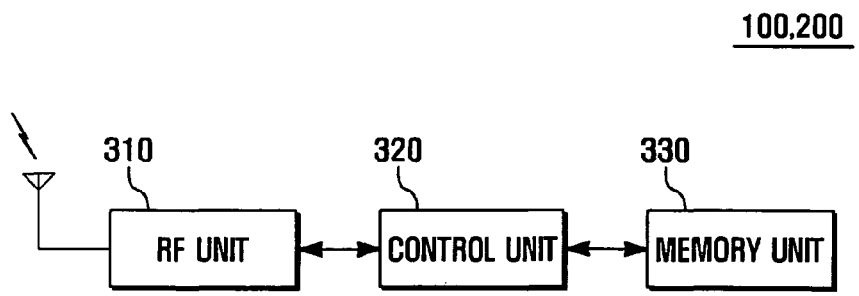
FIG. 3 is a schematic block diagram illustrating a network device according to an exemplary embodiment of the present invention.

FIG. 3 is a schematic block diagram illustrating an example of one way a network device according to an exemplary embodiment of the present invention may look. A person of ordinary skill in the art will appreciate that the arrangement may take forms other than what is shown in FIG. 3.

Referring to FIG. 3, a network device includes a Radio Frequency (RF) unit 310, a control unit 320, and a memory unit 330.

The RF unit 310 is responsible for radio communication of the network device. The RF unit 310 may include, for example, an RF transmitter for up-converting and amplifying a signal to be transmitted and an RF receiver for low noise amplifying and down-converting a signal received through an antenna.

Still referring to FIG. 2, the control unit 320 controls general operations of the network device. The control unit 320 includes a data processing module having a transmitter for encoding and modulating the transmission signal and a receiver for demodulating and decoding the received signal. The data processing module may further include a modem and a codec.

The control unit 320 also collects data using the RF unit 310 and generates packets in real time. The control unit 320 can receive beacon frames via the RF unit 310, and sets parameters such as NB, Ns, CW, and W (defined infra) before transmitting the data. Here, NB comprises the number of times the CSMA/CA algorithm is required to backoff while attempting the current transmission. NB is initialized to 0 before every new transmission. Ns is the number of carrier sensing attempts carried out during the backoff period. CW comprises the contention window length which defines maximum value of a random delay time set in the active period for transmitting data. The CW is set to a number of the timeslots. Typically, the CW is defined in the IEEE 802.11 standards. In this exemplary embodiment, however, the CW defined in the IEEE 802.15.4 standard is used. In the IEEE 802.15.4 standard, the CW is the contention window length, which defines the number of backoff periods that need to be clear of activity before the transmission can start. The CW is initialized to 2 before each transmission attempt. The network device transmits the data when the CW becomes 0 such that the network device checks the slots twice and then transmits the data. BE comprises the backoff exponent, which is related to how many backoff periods a device shall wait before attempting to assess the channel. It is initialized to a minimum value (minBE), e.g. 0. W comprises a backoff value. W is preferably is initialized to 0 and set to an integer randomly selected in the uniform distribution range of 0 to $2^{BE}-1$ as the number of transmission attempts increases. If the backoff value is set, the control unit 320 performs the clear channel assessment (CCA) at a boundary of backoff periods, i.e. checks whether the channel is idle.

If it is determined that the channel is idle, the control unit 320 waits until the backoff value becomes 0 and then transmits the data. If the backoff value is not 0, the control unit 320 waits as much as W/2 or W (Ns−1), and then transmits the data when the backoff value becomes 0. That is, the control unit 320 determines whether the channel is idle every ½ or 1/(Ns−1) of backoff value. In a case that the carrier sensing is performed several times due to the increase of the Ns, the carrier sensing is performed continuously as in the IEEE 802.11 network. In order to avoid the degradation of the energy utilization efficiency due to the continuous carrier sensing, the Ns is preferably set to 2 or 3 in this particular exemplary embodiment. In the meantime, the control unit 320 can be configured, for example, to perform the CCA one more time, when the W becomes 0, prior to transmitting the data.

If the CCA reports a busy medium, the control unit 320 sets the backoff period to L/2. Here, L is the length of data to be transmitted, i.e. the packet length. In a case of using variable packet length, average length of the packets is set to L. that is, the control unit 320 assesses the channel after L/2. In a case that the backoff period is set to L/3 or L/4, the carrier sensing is performed multiple times. This means that the carrier sensing mechanism operates as in the IEEE 802.11 network. In this exemplary embodiment, however, the backoff period is set to L/2 to protect the energy utilization efficiency degradation.

For example, at the time point when the W becomes 0, the control unit 320 performs the CCA one more time and, if the channel is busy or the transmission fails, increases the BE by 1. That is, the backoff value increments exponentially. When The BE exceeds a maximum value, this value of the BE means that the network device has failed packet transmission. The BE can increment to the maximum BE (MaxBE) rather than infinitely in this particular exemplary embodiment. However, the BE can be configured to increase infinitely. Also, the NB can be configured with a maximum value macMAXCSMA. If the value of NB is greater than macMAXCSMA, the network device fails packet transmission.

The memory unit 330 may comprise program and data memories. The program memory can store application programs associated with the operations of the network device, particularly, the application program for communication in the wireless sensor network. The data memory can store application data generated while the application programs operate. Particularly in this exemplary embodiment, the memory unit 330 stores the backoff value W, the number of carrier sensing attempts Ns, the initial values of NB, CW, and BE, MaxBE, and macMAXCSMA.

The operations of the above-structured network device is described hereinafter in more detail.

Figure 4:
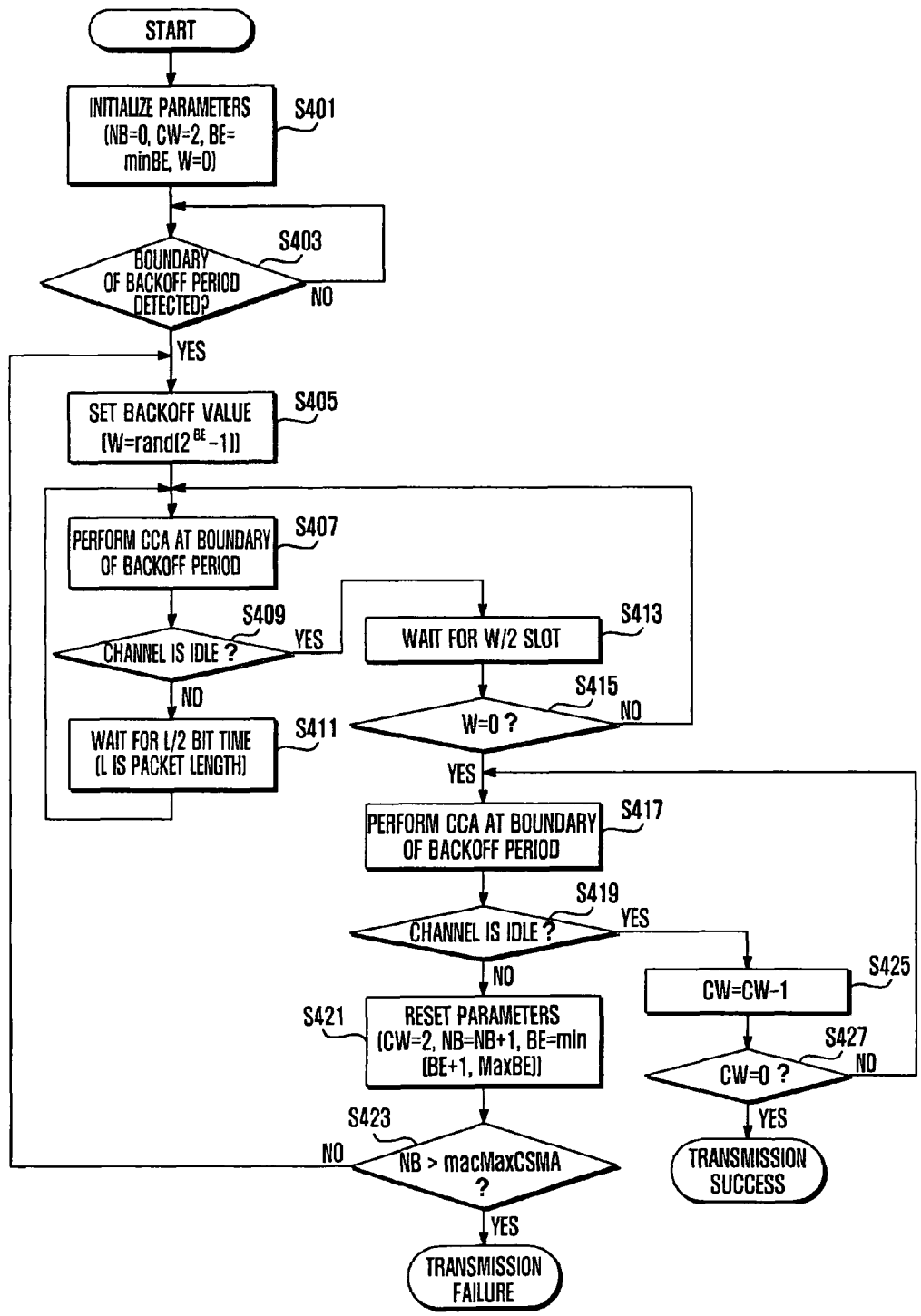
FIG. 4 is a flowchart illustrating a data transmission method of a network device according to an exemplary embodiment of the present invention.

FIG. 4 is a flowchart illustrating exemplary steps of a data transmission method of a network device according to an exemplary embodiment of the present invention.

Referring now to FIG. 4, if a beacon frame is received, the control unit 320 of the network device initializes the NB, CW, BE, and W (S401). Here, the parameters are initialized to NB=0, CW=2, BE=minBE, and W=0.

Next, the control unit 320 detects a boundary point for starting the backoff (S403). When the boundary point is found, the control unit 320 sets the backoff value W (S405). W is set to an integer value selected in the range of 0 to $2^{BE}-1$. As mentioned above, BE comprises the backoff exponent and is typically initialized to 0. The actual backoff time corresponds to a value obtained through multiplication of W with the length of a time slot.

Next, the control unit 320 performs the CCA at the boundary of backoff period (S407). In order to assess the channel, the control unit 320 uses the CCA. Since it is possible to assess whether or not the channel is available at the end of a time slot selected in the CW, the control unit 320 performs the channel assessment at the boundary of the backoff period.

From the result of the CCA, the control unit 320 determines whether or not the channel is idle (S409). If the channel is determined to be busy, the control unit 320 sets the backoff period to L/2 bit time (S411) and repeats step S407 after the backoff period expires. Here, the bit time is the time taken for transmitting 1 bit. It is note that the value of W is maintained even when the backoff period is reset to L/2. Here, L comprises the length of the packet to be transmitted. The control unit 320 checks whether the channel is idle after waiting for half of the packet length. Although the backoff period is set to L/2 in this exemplary embodiment, it can be set differently.

If the channel is assessed to be idle at step S409, the control unit 320 waits as much as W/2 slot (S413) and then determines whether or not the W reaches 0 (S415). Since another network device may transmit a packet even though the channel is assessed to be idle at the time when the CCA is performed, the network device further waits as much as W/2 slot. If the value of W is not 0, the control unit 320 then repeats step S407. That is, the control unit 320 accesses the channel every time interval corresponding ½ of backoff value. Here, ½ is an exemplary value provided for illustrative purposes and can be changed.

If W is 0 at step S415, the control unit 320 performs the CCA at the boundary of the backoff period (S417) and then determines whether or not the channel is idle (S419). If the channel desired to be accessed is idle, the control unit 320 decrements the CW by 1 (CW=CW−1) (S425). Since the CW is initialized to 2 at step S401, it becomes 1 at step S425.

Next, the control unit 320 determines whether or not the value of CW is 0 (S427). If the value of CW is not 0, the control unit 320 repeats step S417 and otherwise, transmits the packet. That is, when CW is initialized to 2, the control unit 320 starts transmission of the data after checking the slot twice.

If the channel is determined to be busy, the control unit 320 maintains the initial value of CW and increments the NB and BE by 1 (S421).

Next, the control unit 320 determines whether or not NB is greater than macMaxCSMA (S423). If NB is greater than macMaxCSMA, the control unit 320 fails to transmit the packet. Otherwise, if the NB is not greater than macMaxCSMA, the control unit 320 repeats step S405.

Figure 5:
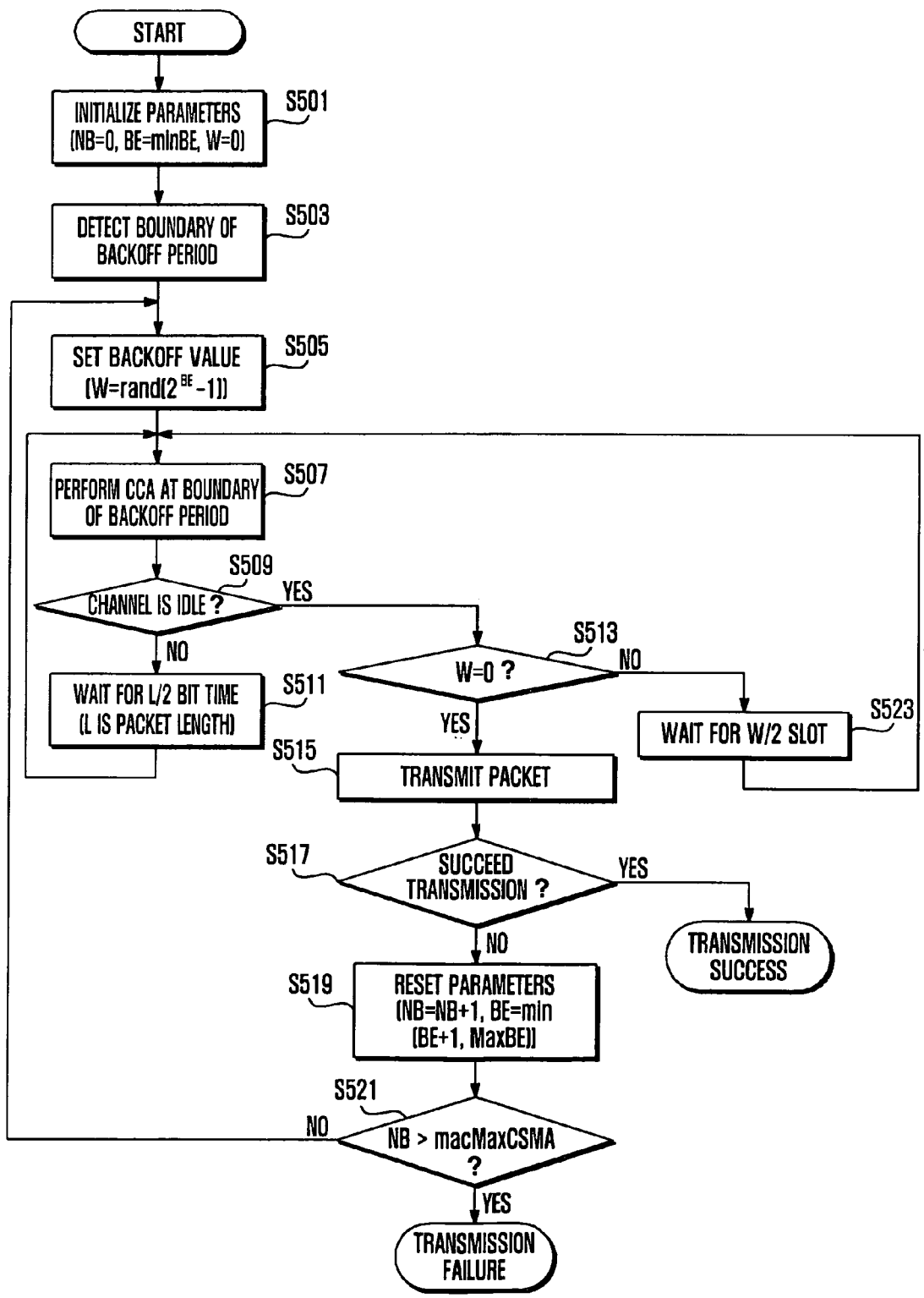
FIG. 5 is a flowchart illustrating a data transmission method of a network device according to another exemplary embodiment of the present invention.

FIG. 5 is a flowchart illustrating exemplary steps of a data transmission method of a network device according to another exemplary embodiment of the present invention.

Referring now to FIG. 5, if a beacon frame is received, the control unit 320 of the network device initializes NB, BE, and W (S501). Here, the parameters are initialized to NB=0, BE=minBE, and W=0.

Next, the control unit 32 detects a boundary of the backoff period to start a backoff (S503).

Next, the control unit 320 sets a backoff value W (S405). The backoff value W is set to a value randomly selected in the range of 0 to $2^{BE}-1$. As mentioned above, BE is the backoff exponent which is initialized to 0.

Once the backoff value W is set, the control unit 320 starts performing the CCA at the boundary of the backoff period (S507). The control unit 320 performs the CCA to assess whether the channel is to be idle.

From the result of the CCA, the control unit 320 assesses whether or not the channel is idle or busy (S509). If the channel is determined to be busy, the control unit 320 sets the backoff period to L/2 bit time (S511) and repeats step S507. Here, L is a length of the packet. The control unit 320 checks whether the channel is idle after waiting for half of the packet length. Although the backoff period is set to L/2 in this exemplary embodiment for illustrative purposes, the backoff period can be set to many different values.

If the channel is determined to be idle at step S509, the control unit 320 determines whether W reaches 0 (S513). If W does not reach 0, the control unit then waits for W/2 slot (S523) and repeats step S507.

Since another network device may transmit a packet even though the channel is determined to be idle at the time when the CCA is performed, the network device further waits for as much as W/2 slot. That is, the control unit 320 accesses the channel every time interval corresponding ½ of backoff value. Here, ½ is an exemplary value and can be changed.

If W reaches 0 at step S513, the control unit 320 transmits the data (S515) and determines whether the transmission succeeds (S517). If the transmission succeeds, the control unit 320 will end the data transmission.

Otherwise, if the transmission fails, the control unit 320 increments NB and BE by 1 respectively (S519). Here, BE can be incremented up to the maximum value (MaxBE).

Next, the control unit 320 determines whether or not NB is greater than macMaxCSMA (S521). If NB is greater than macMaxCSMA, the data transmission fails. If NB is not greater than macMaxCSMA, the control unit 320 repeats step S505.

FIG. 6 is a flowchart illustrating exemplary steps of a data transmission method of a network device according to another exemplary embodiment of the present invention. This exemplary embodiment shows for illustrative purposes a generalized version of data transmission methods of the above described embodiments.

Referring now to FIG. 6, if a beacon frame is received, the control unit 320 of the network device initializes NB, Ns, BE, and W (S601). Here, the parameters are initialized, for example, to NB=0, Ns=3, BE=minBE, and W=0. Although Ns is initialized to 3, it can be changed.

After the parameters are initialized, the control unit 320 detects a boundary of the backoff period to start a backoff (S603).

Next, the control unit 320 sets the backoff value W (S605). W is set to an integer value selected in the range of 0 to $2^{BE}-1$. Here, BE is the backoff exponent which is typically set to 0.

Once W is set, the control unit 320 starts the CCA at the boundary of the backoff period (S607). In order to access whether or not the channel is idle, the control unit performs the CCA at the boundary of the backoff period.

From the result of the CCA, the control unit 320 determines whether or not the channel is to idle (S609). If the channel is determined to be busy, the control unit 320 sets the backoff period to L/2 bit time (S611) and repeats step S607. Here, L comprises the length of the packet to be transmitted. The control unit 320 checks whether or not the channel is idle after waiting for half of the packet length. Although the backoff period is set to L/2 in this particular exemplary embodiment, it can be set differently.

If the channel is determined to be idle at step S609, the control unit 320 then determines whether or not W reaches 0 (S613). If W does not reach 0, the control unit 320 waits for W/(Ns−1) (S623) and then repeats step S607. Since another network device may transmit a packet even though the channel is assessed to be idle at the time when the CCA is performed, the network device further waits as much as W/(Ns−1) when W is not 0. With the Ns set to 3, the control unit 320 determines, every ⅓ of the backoff value, whether or not the channel is idle. The value of Ns can be changed.

If W reaches 0 at step S613, the control unit 320 attempts to transmit the packet (S615). Next, the control unit 320 determines whether or not the packet has been successfully transmitted (S617). If the packet transmission succeeds, the control unit 320 ends the data transmission procedure.

Otherwise, if the packet transmission fails, the control unit 320 resets parameters by incrementing NB and BE by 1 respectively (S619). BE can be incremented up to a maximum value MaxBE.

Next, the control unit 320 determines whether or not NB is greater than macMaxCSMA (S621). If the NB is greater than macMaxCSMA, the packet transmission fails. Otherwise, if the NB is not greater than macMaxCSMA, the control unit 320 repeats step S605.

In the meantime, when W reaches 0 at step S613, the control unit 320 may perform the CCA one more time as in FIG. 4, rather than attempting transmission of the packet. That is, when it is determined that W is 0, the control unit 320 performs processes corresponding to steps S417 and S419 of FIG. 4 and then S619 and S621 of FIG. 6. Also, the control unit 320 further may perform the processes corresponding to S425 and S427 following steps S417 and S419.

Although exemplary embodiments of the present invention have been described in detail hereinabove, it should be clearly understood that many variations and/or modifications of the basic inventive concepts herein taught which may appear to those skilled in the present art will still fall within the spirit of the present invention and scope of the appended claims.

As described above, the data transmission method for a wireless sensor network according to the present invention is implemented with the advantages of the channel access efficiency of the IEEE 802.11 and the energy utilization efficiency of the IEEE 802.15.4.

Also, the data transmission method of the present invention is advantageous in both the energy utilization efficiency and channel access efficiency by reducing time taken for carrier sensing in comparison with the IEEE 802.15.4 network and increasing a number of carrier sensing attempts but less than that in the IEEE 802.11 network.

What is claimed is:

1. A data transmission method for a wireless sensor network including a network coordinator and a plurality of network devices, comprising:
   assessing channel availability after initializing, when a packet to be transmitted is generated, with regard to a number of carrier sensing attempts and a backoff value;
   determining, when the channel availability is assessed to be idle, whether or not the backoff value reaches 0;
   transmitting the packet if the backoff value reaches 0; and
   reassessing, if the backoff value does not reach 0, the channel after a duration corresponding to a time slot which equals to W/(Ns-1);
   wherein determining whether the backoff value reaches 0 comprises setting, when the channel availability is determined to be busy, a backoff period equal to L/2 bit time being a fraction of L and reassessing the channel, wherein L comprises a length of the packet, and wherein the value of the backoff value is set to an integer value selected in the range of 0 to $2^{BE}$-1 where BE comprises a backoff exponent.

2. The data transmission method of claim 1, wherein transmitting the packet comprises:
  reassessing the channel at a boundary of a backoff period; and transmitting the packet when the channel is assessed to be idle.

3. The data transmission method of claim 1, wherein the backoff value (W) is set to an integer value selected in the range of 0 to $2^{BE}$-1 where BE is a backoff exponent.

4. A data transmission method for a wireless sensor network including a network coordinator and a plurality of network devices, comprising:
  assessing a channel availability after initializing, when a packet to be transmitted is generated, with regard to a number of carrier sensing attempts(Ns) and a backoff value (W);
    determining when, the channel availability is assessed to be idle, whether or not the backoff value (W) reaches 0;
  transmitting the packet if the backoff value (W) reaches 0; and
  reassessing, if the backoff value(W) does not reach 0, the channel after a duration corresponding to a time slot which equals to W/(Ns-1);
  wherein transmitting the packet comprises: reassessing the channel at a boundary of a backoff period; and transmitting the packet when the channel is assessed to be idle, wherein the value of (W) is the backoff value is set to an integer value selected in the range of 0 to $2^{BE}$-1 where BE comprises a baekoff exponent, and
  wherein determining whether the backoff value(W) reaches 0 comprises setting, when the channel availability is determined to be busy, a backoff period equal to L/2 bit time and reassessing the channel where L comprises a length of the packet.

5. Transmission A data transmission method for a wireless sensor network including a network coordinator and a plurality of network devices, comprising:
  assessing a channel availability after initializing, when a packet to be transmitted is generated with regard to a number of carrier sensing attempts (Ns) and a backoff value (W);
  determining when the channel availability is assessed to be idle, whether or not (W) the backoff value reaches 0;
  transmitting the packet if the backoff value (W) reaches 0; and
  reassessing, if the backoff value(W) does not reach 0, the channel after a duration corresponding to a time slot which equals to W/(Ns-1);
  wherein transmitting the packet comprises:
  reassessing the channel at a boundary of a backoff period; and
  transmitting the packet when the channel is assessed to be idle,
  wherein the value of the backoff value(W) is set to an integer value selected in the range of 0 to $2^{BE}$-1 where BE comprises a baekoff exponent, and
  wherein the baekoff value(W) is set to an integer value selected in the range of 0 to $2^{BE}$-1 where BE comprises a baekoff exponent,
  wherein determining whether the backoff value(W) reaches 0 comprises setting, when the channel availability is determined to be busy, a backoff period is set to one of L/3 and L/4, where L comprises a length of the packet, and wherein the carrier sensing attempts(Ns) are performed multiple times.

6. The data transmission method of claim 1 wherein transmitting the packet comprises incrementing a backoff exponent twice when transmitting the packet initially fails, wherein the backoff exponent is incremented up to a predetermined value.

7. The data transmission method of claim 2, wherein transmitting the packet comprises incrementing a backoff exponent twice when the channel is assessed to be busy, wherein the backoff exponent is incremented up to a predetermined value.

8. A network device for a wireless sensor network including a network coordinator and a plurality of network devices, comprising:
  a memory unit for storing a packet generated in the network device;
  a control unit for initializing a number of carrier sensing attempts and a backoff value and assessing a channel availability when a packet to be transmitted is generated, and for determining, when the channel availability is assessed to be idle, whether or not the backoff value reaches 0, transmitting the packet if the backoff value reaches 0, and reassessing the channel availability after a duration corresponding to a time slot which equals to W/(Ns-1) if the backoff value does not reach 0; and
  a radio frequency unit for transmitting the packet;
  wherein determining whether the backoff value reaches 0 comprises setting, when the channel availability is determined to be busy, a backoff period equal to L/2 bit time being a fraction of L and reassessing the channel, wherein L comprises a length of the packet, and wherein the value of the backoff value is set to an integer value selected in the range of 0 to $2^{BE}$-1 where BE comprises a backoff exponent.

9. The network device of claim 8, wherein the control unit re-assesses the channel availability at a boundary era backoff period and transmits the packet when the channel availability is assessed to be idle.

10. The network device of claim 8, wherein the backoff value (W) is set to an integer value selected in the range of 0 to $2^{BE}$-1 where BE comprises a backoff exponent.

11. The network device of claim 9, wherein the backoff value (W) is set to an integer value selected in the range of 0 to $2^{BE}$ where BE comprises a backoff exponent.

12. A network device for a wireless sensor network including, a network coordinator and a plurality of network devices, comprising:
  a memory unit for storing a packet generated in the network device;
  a control unit for initializing a number of carrier sensing attempts(Ns) and a backoff value(W) and assessing a channel availability when a packet to be transmitted is generated, and for determining, when the channel availability is assessed to be idle, whether or not the backoff value(W) reaches 0, transmitting the packet if the backoff value(W) reaches 0, and reassessing the channel availability after a duration corresponding to the time slot which equals to W/(Ns-1) if the bakeoff value (W) does not reach 0; and
  a radio frequency atilt for transmitting the packet;
  wherein the bakeoff value(W) is set to art integer value selected in the range of 0 to $2^{BE}$-1 where BE comprises a backoff exponent; and wherein the control unit sets the backoff period to L/2 bit time and reassesses the channel when the channel is assessed to be busy wherein L comprises a length, of the packet.

13. A network device for a wireless sensor network including a network coordinator and a plurality of network devices, comprising:

a memory unit for storing a packet generated in the network device; a control unit for initializing a number of carrier sensing attempts (Ns) and a backoff value (W) and assessing a channel availability when a packet to be transmitted is generated, and for determining, when the channel availability is assessed to be idle, whether or not the backoff value reaches 0, transmitting the packet if the backoff value (W) reaches 0. . and reassessing the channel availability after a duration corresponding to the time slot which equals to W/(Ns-1) if W does not reach 0; and a radio frequency unit for transmitting the packet;

wherein the backoff value is set to an integer value selected in the range of 0 to $2^{BE}$-1 where BE complies a backoff exponent, and wherein the control unit sets the backoff period to one of L/3 and L/4 bit time and reassesses the channel when the channel is assessed to be busy, wherein L comprises a length of the packet.

14. The network device of claim 8, wherein the control unit increments a backoff exponent twice when transmitting the packet fails, wherein the backoff exponent is incremented up to a predetermined value.

15. The network device of claim 9, wherein the control unit increments a backoff exponent twice when the channel is assessed to be busy, wherein the backoff exponent is incremented up to a predetermined value.

\* \* \* \* \*